United States Patent
Nakajima et al.

(10) Patent No.: US 9,218,846 B2
(45) Date of Patent: Dec. 22, 2015

(54) DEMODULATION METHOD OF MAGNETIC DATA AND DEMODULATION DEVICE OF MAGNETIC DATA

(71) Applicant: NIDEC SANKYO CORPORATION, Suwa-gun, Nagano (JP)

(72) Inventors: Shigeo Nakajima, Nagano (JP); Katsuhisa Higashi, Nagano (JP); Yoichi Isono, Nagano (JP)

(73) Assignee: NIDEC SANKYO CORPORATION (JP)

(*) Notice: Subject to any disclaimer, the term of this patent is extended or adjusted under 35 U.S.C. 154(b) by 0 days.

(21) Appl. No.: 14/669,409

(22) Filed: Mar. 26, 2015

(65) Prior Publication Data

US 2015/0279417 A1 Oct. 1, 2015

(30) Foreign Application Priority Data

Mar. 26, 2014 (JP) .................. 2014-063019

(51) Int. Cl.
- G11B 5/02 (2006.01)
- G11B 20/10 (2006.01)
- G11B 20/12 (2006.01)
- G11B 5/09 (2006.01)

(52) U.S. Cl.
CPC .......... G11B 20/10287 (2013.01); G11B 5/09 (2013.01); G11B 20/1252 (2013.01)

(58) Field of Classification Search
CPC ............ G11B 5/59655; G11B 20/10009; G11B 5/59688; G11B 27/36; G11B 5/012; G11B 2220/20; G11B 2220/90; G11B 5/09
USPC .......... 360/25, 26, 29, 31, 40, 39, 54
See application file for complete search history.

(56) References Cited

U.S. PATENT DOCUMENTS 6,034,934 A * 3/2000 Miyake et al. ............ 369/53.28

FOREIGN PATENT DOCUMENTS

JP 2013025852 A 2/2013

* cited by examiner

*Primary Examiner* — Nabil Hindi
(74) *Attorney, Agent, or Firm* — Cantor Colburn LLP

(57) ABSTRACT

A demodulation method of magnetic data may include a first data creating step which creates a preliminary data string for creating the demodulation data on a basis of an interval that is a time interval between peaks of a read signal of an analog-shaped magnetic data, and a second data creating step which creates a demodulation data creating data for creating the demodulation data on a basis of the preliminary data string created in the first data creating step. When a peak of the read signal is not detected for a predetermined time, a pseudo-peak is generated and a pseudo-interval is stored in a data storage section, and steps similar to the first data creating step and the second data creating step are executed, and the pseudo-peak is generated until the demodulation data creating data corresponding to a final interval is created.

12 Claims, 10 Drawing Sheets

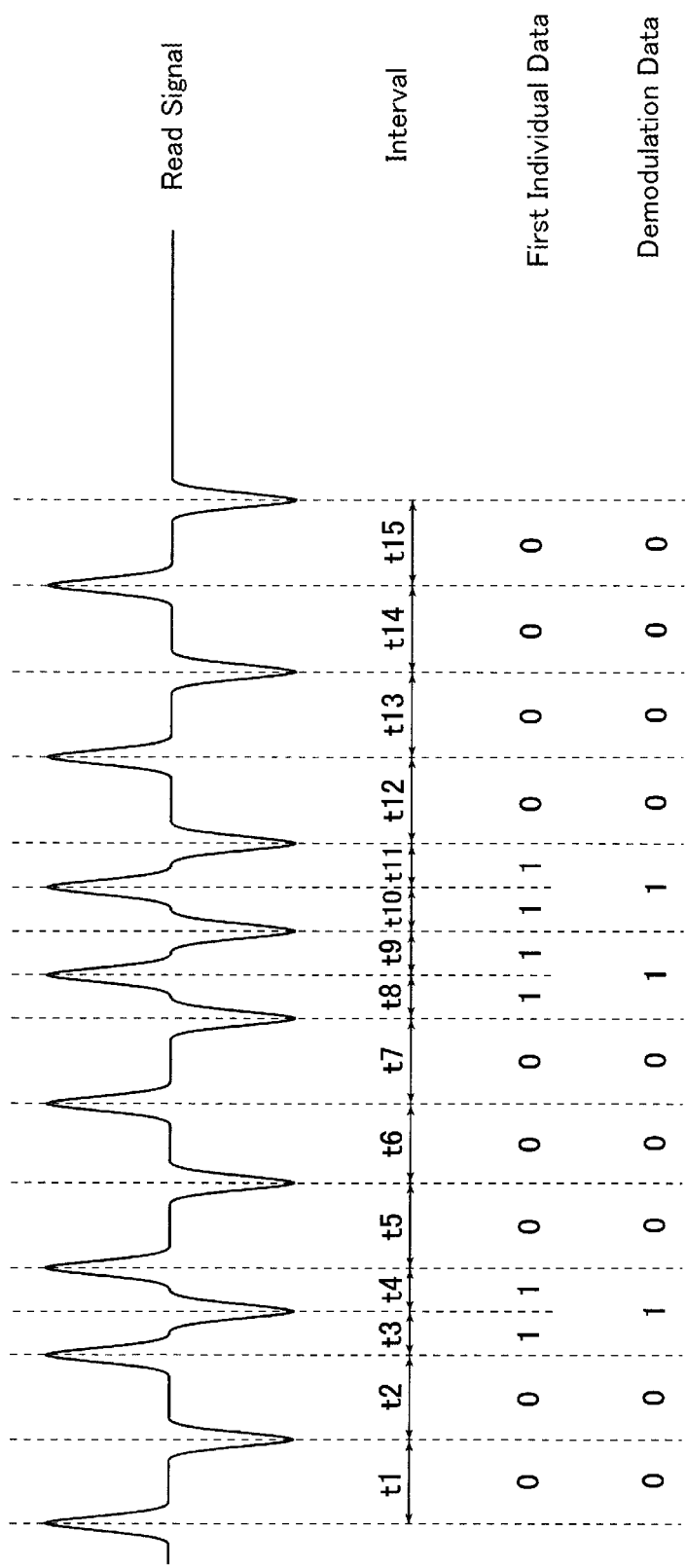

Fig. 3

|  | First Bit | Second Bit | Third Bit | Fourth Bit | Fifth Bit |
|---|---|---|---|---|---|
| Preliminary Data String 1 | 0 | 0 | 1 | 1 | 0 |
| Preliminary Data String 2 | 0 | 1 | 1 | 0 | 0 |
| Preliminary Data String 3 | 1 | 1 | 0 | 0 | 0 |
| Preliminary Data String 4 | 1 | 0 | 0 | 0 | 1 |
| Preliminary Data String 5 | 0 | 0 | 0 | 1 | 1 |
| Preliminary Data String 6 | 0 | 0 | 1 | 1 | 1 |
| Preliminary Data String 7 | 0 | 1 | 1 | 1 | 1 |
| Preliminary Data String 8 | 1 | 1 | 1 | 1 | 0 |
| Preliminary Data String 9 | 1 | 1 | 1 | 0 | 0 |
| Preliminary Data String 10 | 1 | 1 | 0 | 0 | 0 |
| Preliminary Data String 11 | 1 | 0 | 0 | 0 | 0 |
| Preliminary Data String 12 | 0 | 0 | 0 | 0 | 0 |
| Preliminary Data String 13 | 0 | 0 | 0 | 0 | 0 |
| Preliminary Data String 14 | 0 | 0 | 0 | 0 | 0 |
| Preliminary Data String 15 | 0 | 0 | 0 | 0 | 0 |

Demodulation Data Creating Data

Fig. 4

| | Determined Interval | | | | | Total Sum of Absolute Values |
|---|---|---|---|---|---|---|
| | 1 | 2 | 3 | 4 | 5 | |
| | 441 | 278 | 338 | 631 | 637 | |
| Bit Pattern 1 | "0" | "0" | "0" | "0" | "0" | |
| Reference Interval | 681 | 681 | 681 | 681 | 681 | |
| Absolute Value of Differnce of Reference & Determined Intervals | 240 | 403 | 343 | 50 | 44 | 1080 |
| Bit Pattern 2 | "1" | "1" | "0" | "0" | "0" | |
| Reference Interval | 340.5 | 340.5 | 681 | 681 | 681 | |
| Absolute Value of Differnce of Reference & Determined Intervals | 100.5 | 62.5 | 343 | 50 | 44 | 600 |
| Bit Pattern 3 | "0" | "1" | "1" | "0" | "0" | |
| Reference Interval | 681 | 340.5 | 340.5 | 681 | 681 | |
| Absolute Value of Differnce of Reference & Determined Intervals | 240 | 62.5 | 2.5 | 50 | 44 | 399 |
| Bit Pattern 4 | "0" | "0" | "1" | "1" | "0" | |
| Reference Interval | 681 | 681 | 340.5 | 340.5 | 681 | |
| Absolute Value of Differnce of Reference & Determined Intervals | 240 | 403 | 2.5 | 290.5 | 44 | 980 |
| Bit Pattern 5 | "1" | "1" | "1" | "1" | "0" | |
| Reference Interval | 340.5 | 340.5 | 340.5 | 340.5 | 681 | |
| Absolute Value of Differnce of Reference & Determined Intervals | 100.5 | 62.5 | 2.5 | 290.5 | 44 | 500 |
| Bit Pattern 6 | "0" | "0" | "0" | "0" | "1" | |
| Reference Interval | 681 | 681 | 681 | 681 | 340.5 | |
| Absolute Value of Differnce of Reference & Determined Intervals | 240 | 403 | 343 | 50 | 296.5 | 1332.5 |
| Bit Pattern 7 | "1" | "1" | "0" | "0" | "1" | |
| Reference Interval | 340.5 | 340.5 | 681 | 681 | 340.5 | |
| Absolute Value of Differnce of Reference & Determined Intervals | 100.5 | 62.5 | 343 | 50 | 296.5 | 852.5 |
| Bit Pattern 8 | "0" | "1" | "1" | "0" | "1" | |
| Reference Interval | 681 | 340.5 | 340.5 | 681 | 340.5 | |
| Absolute Value of Differnce of Reference & Determined Intervals | 240 | 62.5 | 2.5 | 50 | 296.5 | 651.5 |
| Bit Pattern 9 | "0" | "0" | "0" | "1" | "1" | |
| Reference Interval | 681 | 681 | 681 | 340.5 | 340.5 | |
| Absolute Value of Differnce of Reference & Determined Intervals | 240 | 403 | 343 | 290.5 | 296.5 | 1573 |
| Bit Pattern 10 | "1" | "1" | "0" | "1" | "1" | |
| Reference Interval | 340.5 | 340.5 | 681 | 340.5 | 340.5 | |
| Absolute Value of Differnce of Reference & Determined Intervals | 100.5 | 62.5 | 343 | 290.5 | 296.5 | 1093 |
| Bit Pattern 11 | "0" | "0" | "1" | "1" | "1" | |
| Reference Interval | 681 | 681 | 340.5 | 340.5 | 340.5 | |
| Absolute Value of Differnce of Reference & Determined Intervals | 240 | 403 | 2.5 | 290.5 | 296.5 | 1232.5 |
| Bit Pattern 12 | "0" | "1" | "1" | "1" | "1" | |
| Reference Interval | 681 | 340.5 | 340.5 | 340.5 | 340.5 | |
| Absolute Value of Differnce of Reference & Determined Intervals | 240 | 62.5 | 2.5 | 290.5 | 296.5 | 892 |
| Bit Pattern 13 | "1" | "1" | "1" | "1" | "1" | |
| Reference Interval | 340.5 | 340.5 | 340.5 | 340.5 | 340.5 | |
| Absolute Value of Differnce of Reference & Determined Intervals | 100.5 | 62.5 | 2.5 | 290.5 | 296.5 | 752.5 |

Fig. 5(A)

| Data Storage Part (9) | Determined Interval 5 | t9 |
|---|---|---|
| Data Storage Part (8) | Determined Interval 4 | t8 |
| Data Storage Part (7) | Determined Interval 3 | t7 |
| Data Storage Part (6) | Determined Interval 2 | t6 |
| Data Storage Part (5) | Determined Interval 1 | t5 |
| Data Storage Part (4) | Calculation Interval 4 | t4 |
| Data Storage Part (3) | Calculation Interval 3 | t3 |
| Data Storage Part (2) | Calculation Interval 2 | t2 |
| Data Storage Part (1) | Calculation Interval 1 | t1 |
| Data Storage Part (0) |  | — |

Fig. 5(B)

| Data Storage Part (9) | Determined Interval 5 | t10 |
|---|---|---|
| Data Storage Part (8) | Determined Interval 4 | t9 |
| Data Storage Part (7) | Determined Interval 3 | t8 |
| Data Storage Part (6) | Determined Interval 2 | t7 |
| Data Storage Part (5) | Determined Interval 1 | t6 |
| Data Storage Part (4) | Calculation Interval 4 | t5 |
| Data Storage Part (3) | Calculation Interval 3 | t4 |
| Data Storage Part (2) | Calculation Interval 2 | t3 |
| Data Storage Part (1) | Calculation Interval 1 | t2 |
| Data Storage Part (0) |  | t1 |

Fig. 5(C)

| Data Storage Part (9) | Determined Interval 5 | t11 |
|---|---|---|
| Data Storage Part (8) | Determined Interval 4 | t10 |
| Data Storage Part (7) | Determined Interval 3 | t9 |
| Data Storage Part (6) | Determined Interval 2 | t8 |
| Data Storage Part (5) | Determined Interval 1 | t7 |
| Data Storage Part (4) | Calculation Interval 4 | t6 |
| Data Storage Part (3) | Calculation Interval 3 | t5 |
| Data Storage Part (2) | Calculation Interval 2 | t4 |
| Data Storage Part (1) | Calculation Interval 1 | t3 |
| Data Storage Part (0) |  | t2 |

Fig. 5(D)

| Data Storage Part (9) | Determined Interval 5 | t12 |
|---|---|---|
| Data Storage Part (8) | Determined Interval 4 | t11 |
| Data Storage Part (7) | Determined Interval 3 | t10 |
| Data Storage Part (6) | Determined Interval 2 | t9 |
| Data Storage Part (5) | Determined Interval 1 | t8 |
| Data Storage Part (4) | Calculation Interval 4 | t7 |
| Data Storage Part (3) | Calculation Interval 3 | t6 |
| Data Storage Part (2) | Calculation Interval 2 | t5 |
| Data Storage Part (1) | Calculation Interval 1 | t4 |
| Data Storage Part (0) |  | t3 |

Fig. 5(E)

| Data Storage Part (9) | Determined Interval 5 | t13 |
|---|---|---|
| Data Storage Part (8) | Determined Interval 4 | t12 |
| Data Storage Part (7) | Determined Interval 3 | t11 |
| Data Storage Part (6) | Determined Interval 2 | t10 |
| Data Storage Part (5) | Determined Interval 1 | t9 |
| Data Storage Part (4) | Calculation Interval 4 | t8 |
| Data Storage Part (3) | Calculation Interval 3 | t7 |
| Data Storage Part (2) | Calculation Interval 2 | t6 |
| Data Storage Part (1) | Calculation Interval 1 | t5 |
| Data Storage Part (0) |  | t4 |

Fig. 5(F)

| Data Storage Part (9) | Determined Interval 5 | t14 |
|---|---|---|
| Data Storage Part (8) | Determined Interval 4 | t13 |
| Data Storage Part (7) | Determined Interval 3 | t12 |
| Data Storage Part (6) | Determined Interval 2 | t11 |
| Data Storage Part (5) | Determined Interval 1 | t10 |
| Data Storage Part (4) | Calculation Interval 4 | t9 |
| Data Storage Part (3) | Calculation Interval 3 | t8 |
| Data Storage Part (2) | Calculation Interval 2 | t7 |
| Data Storage Part (1) | Calculation Interval 1 | t6 |
| Data Storage Part (0) |  | t5 |

Fig. 7

| | Pattern A | Pattern B | Pattern C | Pattern D | Pattern E | Pattern F | Pattern G |
|---|---|---|---|---|---|---|---|
| First Individual Data Corresponding to Calculation Interval 4 | 0 | 0 | 1 | 1 | 1 | 1 | 1 |
| First Individual Data Corresponding to Calculation Interval 3 | 0 | 1 | 0 | 0 | 1 | 1 | 1 |
| First Individual Data Corresponding to Calculation Interval 2 | × | × | 0 | 1 | 1 | 1 | 0 |
| First Individual Data Corresponding to Calculation Interval 1 | × | × | × | × | 0 | 1 | × |

Fig. 8(A)

| | | |
|---|---|---|
| Data_Storage_Part (9) | Determined Interval 5 | t15 |
| Data_Storage_Part (8) | Determined Interval 4 | t14 |
| Data_Storage_Part (7) | Determined Interval 3 | t13 |
| Data_Storage_Part (6) | Determined Interval 2 | t12 |
| Data_Storage_Part (5) | Determined Interval 1 | t11 |
| Data_Storage_Part (4) | Calculation Interval 4 | t10 |
| Data_Storage_Part (3) | Calculation Interval 3 | t9 |
| Data_Storage_Part (2) | Calculation Interval 2 | t8 |
| Data_Storage_Part (1) | Calculation Interval 1 | t7 |
| Data_Storage_Part (0) | | t6 |

Fig. 8(B)

| | | |
|---|---|---|
| Data_Storage_Part (9) | Determined Interval 5 | tD1 |
| Data_Storage_Part (8) | Determined Interval 4 | t15 |
| Data_Storage_Part (7) | Determined Interval 3 | t14 |
| Data_Storage_Part (6) | Determined Interval 2 | t13 |
| Data_Storage_Part (5) | Determined Interval 1 | t12 |
| Data_Storage_Part (4) | Calculation Interval 4 | t11 |
| Data_Storage_Part (3) | Calculation Interval 3 | t10 |
| Data_Storage_Part (2) | Calculation Interval 2 | t9 |
| Data_Storage_Part (1) | Calculation Interval 1 | t8 |
| Data_Storage_Part (0) | | t7 |

Fig. 8(C)

| | | |
|---|---|---|
| Data_Storage_Part (9) | Determined Interval 5 | tD2 |
| Data_Storage_Part (8) | Determined Interval 4 | tD1 |
| Data_Storage_Part (7) | Determined Interval 3 | t15 |
| Data_Storage_Part (6) | Determined Interval 2 | t14 |
| Data_Storage_Part (5) | Determined Interval 1 | t13 |
| Data_Storage_Part (4) | Calculation Interval 4 | t12 |
| Data_Storage_Part (3) | Calculation Interval 3 | t11 |
| Data_Storage_Part (2) | Calculation Interval 2 | t10 |
| Data_Storage_Part (1) | Calculation Interval 1 | t9 |
| Data_Storage_Part (0) | | t8 |

Fig. 8(D)

| | | |
|---|---|---|
| Data_Storage_Part (9) | Determined Interval 5 | tD3 |
| Data_Storage_Part (8) | Determined Interval 4 | tD2 |
| Data_Storage_Part (7) | Determined Interval 3 | tD1 |
| Data_Storage_Part (6) | Determined Interval 2 | t15 |
| Data_Storage_Part (5) | Determined Interval 1 | t14 |
| Data_Storage_Part (4) | Calculation Interval 4 | t13 |
| Data_Storage_Part (3) | Calculation Interval 3 | t12 |
| Data_Storage_Part (2) | Calculation Interval 2 | t11 |
| Data_Storage_Part (1) | Calculation Interval 1 | t10 |
| Data_Storage_Part (0) | | t9 |

Fig. 8(E)

| | | |
|---|---|---|
| Data_Storage_Part (9) | Determined Interval 5 | tD4 |
| Data_Storage_Part (8) | Determined Interval 4 | tD3 |
| Data_Storage_Part (7) | Determined Interval 3 | tD2 |
| Data_Storage_Part (6) | Determined Interval 2 | tD1 |
| Data_Storage_Part (5) | Determined Interval 1 | t15 |
| Data_Storage_Part (4) | Calculation Interval 4 | t14 |
| Data_Storage_Part (3) | Calculation Interval 3 | t13 |
| Data_Storage_Part (2) | Calculation Interval 2 | t12 |
| Data_Storage_Part (1) | Calculation Interval 1 | t11 |
| Data_Storage_Part (0) | | t10 |

| Preamble | Effective Data Part | Postamble |
|---|---|---|

DEMODULATION METHOD OF MAGNETIC DATA AND DEMODULATION DEVICE OF MAGNETIC DATA

CROSS REFERENCE TO RELATED APPLICATION

The present invention claims priority under 35 U.S.C. §119 to Japanese Application No. 2014-063019 filed Mar. 26, 2014, the entire content of which is incorporated herein by reference.

FIELD OF THE INVENTION

At least an embodiment of the present invention may relate to a demodulation method of magnetic data and a demodulation device of magnetic data in which magnetic data recorded on a magnetic information recording medium are read and demodulation data are created.

BACKGROUND

Conventionally, a demodulation device of magnetic data in which magnetic data recorded on a magnetic information recording medium are read and demodulation data are created has been proposed by the present applicant (see, for example, Japanese Patent Laid-Open No. 2013-25852). The demodulation device described in the Patent Literature includes a magnetic head which reads magnetic data recorded on a magnetic information recording medium and a data demodulation section in which magnetic data read by the magnetic head are demodulated and demodulation data are created. The data demodulation section includes a preliminary data creating section, which creates a plurality of preliminary data strings for creating demodulation data based on intervals, i.e., time intervals between peaks of an analog-shaped read signal of magnetic data outputted from the magnetic head, and a demodulation data creating section which creates demodulation data based on a plurality of preliminary data strings created in the preliminary data creating section. The preliminary data string is configured of first individual data of 5 bits specified on the basis of the intervals. The preliminary data creating section includes a data storage section in which an interval is stored each time a peak of a read signal is detected. Further, the preliminary data creating section stores a template in which a part of a plurality of bit patterns configured of second individual data of 5 bits is listed.

In the demodulation device described in the above-mentioned Patent Literature, an interval which is newly stored in the data storage section when a peak of a read signal is detected is set as a fifth interval to be determined (determined interval "5"), the fifth interval to be determined (determined interval "5") having been stored in the data storage section when the peak of the read signal is detected is shifted to a fourth interval to be determined (determined interval "4"), the fourth interval to be determined (determined interval "4") is shifted to a third interval to be determined (determined interval "3"), the third interval to be determined (determined interval "3") is shifted to a second interval to be determined (determined interval "2"), the second interval to be determined (determined interval "2") is shifted to a first interval to be determined (determined interval "1"), the first interval to be determined (determined interval "1") is shifted to a fourth interval for calculation (calculation interval "4"), the fourth interval for calculation (calculation interval "4") is shifted to a third interval for calculation (calculation interval "3"), the third interval for calculation (calculation interval "3") is shifted to a second interval for calculation (calculation interval "2"), and the second interval for calculation (calculation interval "2") is shifted to a first interval for calculation (calculation interval "1").

Further, in the demodulation device, the preliminary data creating section executes an reference interval specifying step in which a first reference interval and a second reference interval are specified on the basis of an interval for calculation each time an interval is stored in the data storage section, a reference interval assigning step in which, for every second individual data, when a second individual data is "zero", the first reference interval is assigned to a template and, when the second individual data is "1", the second reference interval is assigned, a comparing step in which, five intervals to be determined and the first reference interval or the second reference interval assigned to the template are compared for every bit pattern and for every bit of the bit pattern, and a preliminary data specifying step in which a bit pattern corresponding to a preliminary data string is specified on the basis of a comparison result in the comparing step and the specified bit pattern is set to be the preliminary data string. Further, the demodulation data creating section specifies a first individual data of a first bit of the preliminary data string specified in the preliminary data creating section as a data for creating demodulation data and demodulation data are created on the basis of the data. The data specified in the demodulation data creating section is a data corresponding to a first interval to be determined.

As described above, in the demodulation device described in the above-mentioned Patent Literature, each time a peak of a read signal of magnetic data is detected, an interval is stored in the data storage section and demodulation of magnetic data is started. Further, in the demodulation device, a preliminary data string is specified by comparing five determined intervals stored in the data storage section with a first reference interval or a second reference interval assigned to the template, and a first individual data of a first bit of the specified preliminary data string is specified as a data for creating demodulation data. In other words, a plurality of determined intervals is used and thus, in the demodulation device, even when variation of a moving speed of a magnetic information recording medium is large or, even when recording density of magnetic data recorded on a magnetic information recording medium is low, magnetic data can be demodulated appropriately.

Magnetic data recorded on a magnetic information recording medium is, as shown in FIG. 11, commonly configured of a preamble, an effective data part where effective data are recorded, and a postamble. In the preamble and the postamble, magnetic data of all "0" are recorded. Normally, magnetic data of about 22 bits are recorded in a preamble and magnetic data of about 13-30 bits are recorded in a postamble.

In recent years, a magnetic information recording medium is used in various countries and regions and, in some countries and regions, a magnetic information recording medium may be used on which no preamble and no postamble are recorded, or a magnetic information recording medium may be used in which magnetic data recorded in the preamble and the postamble are 3 bits or less. On the other hand, since the demodulation device described in the above-mentioned Patent Literature is structured as described above, in a case that magnetic data are read from a preamble side, unless magnetic data of 4 bits or more are recorded in the postamble, magnetic data recorded in an effective data part cannot be demodulated to the last part. Further, in the demodulation device described in the Patent Literature, in a case that magnetic data are read from a postamble side, unless magnetic data of 4 bits or more are recorded in the preamble, magnetic data recorded in the effective data part cannot be demodulated to the last part. For example, in a case that magnetic data are read from a preamble side and a postamble is not recorded, in the demodulation device described in the Patent Literature, when the last peak of a read signal of magnetic data recorded in the effective data part is detected, no peak is detected afterward and thus demodulation of magnetic data is not executed and magnetic data of the last 4 bits of magnetic data recorded in the effective data part cannot be demodulated.

SUMMARY

In view of the problem described above, at least an embodiment of the present invention may advantageously provide a demodulation method of magnetic data in which magnetic data recorded in an effective data part of a magnetic information recording medium are capable of being demodulated to the last data regardless of variation in the bit number of magnetic data recorded in a preamble and a postamble and, regardless of existence/absence of the preamble and the postamble. Further, at least an embodiment of the present invention may advantageously provide a demodulation device of magnetic data which is capable of demodulating magnetic data recorded in an effective data part of a magnetic information recording medium to the last data regardless of variation in the bit number of magnetic data recorded in a preamble and a postamble and, regardless of existence/absence of the preamble and the postamble.

According to at least an embodiment of the present invention, there may be provided a demodulation method of magnetic data in which magnetic data recorded on a magnetic information recording medium are read and demodulation data are created. The demodulation method includes a first data creating step in which a preliminary data string for creating the demodulation data is created on a basis of an interval which is a time interval between peaks of a read signal of an analog-shaped magnetic data or an interval which is an inversion time interval of a digital signal created from the read signal, and a second data creating step in which a demodulation data creating data for creating the demodulation data is created on a basis of the preliminary data string created in the first data creating step. In a case that "n" is an integer of not less than 2 and "m" is an integer of not less than 2 and not more than "n", the preliminary data string is configured of first individual data of "n" bits which are specified on a basis of the interval, the interval is stored in a data storage section each time a peak of the read signal or an inversion of the digital signal is detected, the first data creating step and the second data creating step are executed each time the interval is stored in the data storage section. The first data creating step includes a reference interval specifying step in which a first reference interval and a second reference interval are specified, the first reference interval being the interval which is a reference for determining that the first individual data of the preliminary data string is "0" and the second reference interval being the interval which is a reference for determining that the first individual data is "1", a reference interval assigning step in which the first reference interval is assigned when a second individual data is "0" and the second reference interval is assigned when the second individual data is "1" to a template in which all or a part of a plurality of bit patterns configured of the second individual data of "n" bits are listed for each of the second individual data, a comparing step in which "n" determined intervals which are intervals for specifying the first individual data are compared with the first reference interval or the second reference interval assigned to the template for every bit pattern, and for every bit of the bit pattern, and a preliminary data specifying step in which the bit pattern corresponding to the preliminary data string is specified on a basis of a compared result in the comparing step and a specified bit pattern is determined as the preliminary data string. In the second data creating step, a first bit of the first individual data of the preliminary data string specified in the preliminary data specifying step is specified as the demodulation data creating data. An interval which is newly stored in the data storage section when a peak of the read signal or an inversion of the digital signal is detected is set as an "n"-th determined interval, and an "m"-th determined interval having been stored in the data storage section when the peak of the read signal or the inversion of the digital signal is detected is set as an "m−1"-th determined interval, and the demodulation data creating data which is specified in the second data creating step is a data corresponding to a first determined interval. When the peak of the read signal or the inversion of the digital signal is not detected for a predetermined time, a pseudo-peak is generated, a pseudo-interval is stored in the data storage section, the pseudo-interval stored is set as the "n"-th determined interval, and the "m"-th determined interval having been stored in the data storage section when the pseudo-peak is generated is set as an "m−1"-th determined interval and then, an additional first data creating step similar to the first data creating step and an additional second data creating step similar to the second data creating step are executed. The pseudo-peak is generated with a predetermined time interval and the pseudo-interval is stored in the data storage section and the additional first data creating step and the additional second data creating step are repeatedly executed until the demodulation data creating data corresponding to a final interval is created.

Further, according to at least an embodiment of the present invention, there may be provided a demodulation device of magnetic data including a magnetic head configured to read magnetic data recorded on a magnetic information recording medium and a data demodulation section in which the magnetic data read by the magnetic head are demodulated and demodulation data are created. The data demodulation section includes a preliminary data creation section in which a preliminary data string for creating the demodulation data is created on a basis of an interval which is a time interval between peaks of a read signal of an analog-shaped magnetic data outputted from the magnetic head or an interval which is an inversion time interval of a digital signal created from the read signal, and a demodulation data creation section in which the demodulation data are created on a basis of the preliminary data string created in the preliminary data creation section. In a case that "n" is an integer of not less than 2 and "m" is an integer of not less than 2 and not more than "n", the preliminary data string is configured of first individual data of "n" bits specified on a basis of the interval, and the preliminary data creation section is provided with a data storage section in which the interval is stored each time a peak of the read signal or an inversion of the digital signal is detected. The preliminary data creation section is stored with a template in which all or a part of a plurality of bit patterns configured of second individual data of "n" bits are listed. The preliminary data creation section executes a following first data creating step. The first data creating step includes a reference interval specifying step in which a first reference interval and a second reference interval are specified, the first reference interval being the interval which is a reference for determining that the first individual data of the preliminary data string is "0" and the second reference interval being the interval which is a reference for determining that the first individual data is "1", a reference interval assigning step in which the first reference interval is assigned to the template when the second individual data is "0" and the second reference interval is assigned to the template when the second individual data is "1" for each of the second individual data, a comparing step in which "n" determined intervals which are intervals for specifying the first individual data are compared with the first reference interval or the second reference interval assigned to the template for every bit pattern, and for every bit of the bit pattern, and a preliminary data specifying step in which the bit pattern corresponding to the preliminary data string is specified on a basis of a compared result in the comparing step and a specified bit pattern is determined as the preliminary data string. The demodulation data creation section executes a second data creating step in which a first bit of the first individual data of the preliminary data string specified in the preliminary data creating section is specified as a demodulation data creating data for creating the demodulation data. An interval which is newly stored in the data storage section when a peak of the read signal or an inversion of the digital signal is detected is set as an "n"-th determined interval, and an "m"-th determined interval having been stored in the data storage section when the peak of the read signal or the inversion of the digital signal is detected is set as an "m−1"-th determined interval, and the demodulation data creating data which is specified in the demodulation data creation section is a data corresponding to a first determined interval. When the peak of the read signal or the inversion of the digital signal is not detected for a predetermined time, the data demodulation section generates a pseudo-peak, stores a pseudo-interval in the data storage section, sets the stored pseudo-interval as the "n"-th determined interval, sets the "m"-th determined interval having been stored in the data storage section as the "m−1"-th determined interval when the pseudo-peak is generated, and executes an additional first data creating step similar to the first data creating step and an additional second data creating step similar to the second data creating step, and the data demodulation section generates the pseudo-peak with a predetermined time interval, stores the pseudo-interval in the data storage section, and repeatedly executes the additional first data creating step and the additional second data creating step until the demodulation data creating data corresponding to a final interval is created.

In the demodulation method of magnetic data and the demodulation device of magnetic data in accordance with at least an embodiment of the present invention, when the peak of the read signal or the inversion of the digital signal is not detected for a predetermined time, a pseudo-peak is generated, a pseudo-interval is stored in the data storage section, the pseudo-interval stored is set as the "n"-th determined interval, and the "m"-th determined interval having been stored in the data storage section when the pseudo-peak is generated is set as the "m−1"-th determined interval and then, an additional first data creating step similar to the first data creating step and an additional second data creating step similar to the second data creating step are executed, and the pseudo-peak is generated with a predetermined time interval and the pseudo-interval is stored in the data storage section and the additional first data creating step and the additional second data creating step are repeatedly executed until the demodulation data creating data corresponding to a final interval is created. Therefore, according to at least an embodiment of the present invention, for example, even in a case that magnetic data are read from a preamble side and a postamble is not recorded on a magnetic information recording medium or, in a case that magnetic data are read from a postamble side and a preamble is not recorded on a magnetic information recording medium, after the last peak of a read signal of magnetic data recorded in the effective data part is detected, a pseudo-interval is stored in the data storage section with a pseudo-peak as a trigger and magnetic data for the last "n−1" bits of magnetic data recorded in the effective data part are demodulated. Accordingly, in at least an embodiment of the present invention, magnetic data recorded in the effective data part of a magnetic information recording medium can be demodulated to the last data regardless of variation in the bit number of magnetic data recorded in a preamble and a postamble and, regardless of existence/absence of the preamble and the postamble.

In at least an embodiment of the present invention, the pseudo-peak is generated with a fixed time interval and the pseudo-interval is stored in the data storage section and the additional first data creating step and the additional second data creating step are repeatedly executed until the demodulation data creating data corresponding to a final interval is created. According to the method and structure, in comparison with a case that a time interval is varied when a pseudo-peak is generated, a pseudo-interval is stored in the data storage section, and an additional first data creating step and an additional second data creating step are executed, the demodulation method and the demodulation device of magnetic data can be simplified.

In at least an embodiment of the present invention, the data storage section is provided with "n" data storage parts in which "n" determined intervals are stored and a data storage part for calculation which is provided so as to follow the "n" data storage parts and in which a calculation interval for calculating the first reference interval is stored, and the determined intervals are successively shifted through the "n" data storage parts each time the peak of the read signal or the inversion of the digital signal is detected, and a first determined interval with respect to the "n" determined intervals is successively shifted to the data storage part for calculation and is used as the calculation interval. In this case, it is sufficient that at least "n−1" pseudo-peaks are generated for the "n" determined intervals. For example, even when a preamble and a postamble are not recorded, a read signal of magnetic data recorded in an effective data part can be surely demodulated to the last peak.

In at least an embodiment of the present invention, a plurality of the data storage parts for calculation in which the calculation interval is stored is provided and, in the reference interval specifying step, the first reference interval is specified on a basis of a plurality of the calculation intervals which are successively shifted from the data storage parts in which the determined intervals are stored, and a half value of the first reference interval is specified as the second reference interval. Further, it may be structured that, in the comparing step, an absolute value of a difference between the determined interval and the first reference interval or the second reference interval assigned to the template is calculated for every bit pattern, and for every bit of the bit pattern and, in the preliminary data specifying step, a total sum value is calculated which is a total sum for every bit pattern of the absolute values calculated for every bit in the comparing step and the bit pattern whose calculated total sum value is the smallest is set as the preliminary data string.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 2 is an explanatory view showing a schematic creating procedure of demodulation data in a data demodulation section shown in FIG. 1.

FIG. 3 is a table for explaining a plurality of preliminary data strings which are created in a preliminary data creation section shown in FIG. 1.

FIG. 4 is a table for explaining a template which is stored in the preliminary data creation section shown in FIG. 1.

FIGS. 5(A) through 5(F) are tables for explaining intervals which are stored in the preliminary data creation section shown in FIG. 1.

FIG. 7 is a table for specifically explaining a specifying method of a reference interval in a reference interval specifying step shown in FIG. 6.

FIGS. 8(A) through 8(E) are tables for explaining intervals which are stored in a data storage section of a preliminary data creation section when a pseudo-peak is generated in the demodulation device of magnetic data shown in FIG. 1.

DETAILED DESCRIPTION OF THE PREFERRED EMBODIMENTS

Embodiments of the present invention will be described below with reference to the accompanying drawings.

(Schematic Structure of Demodulation Device of Magnetic Data)

Figure 1:
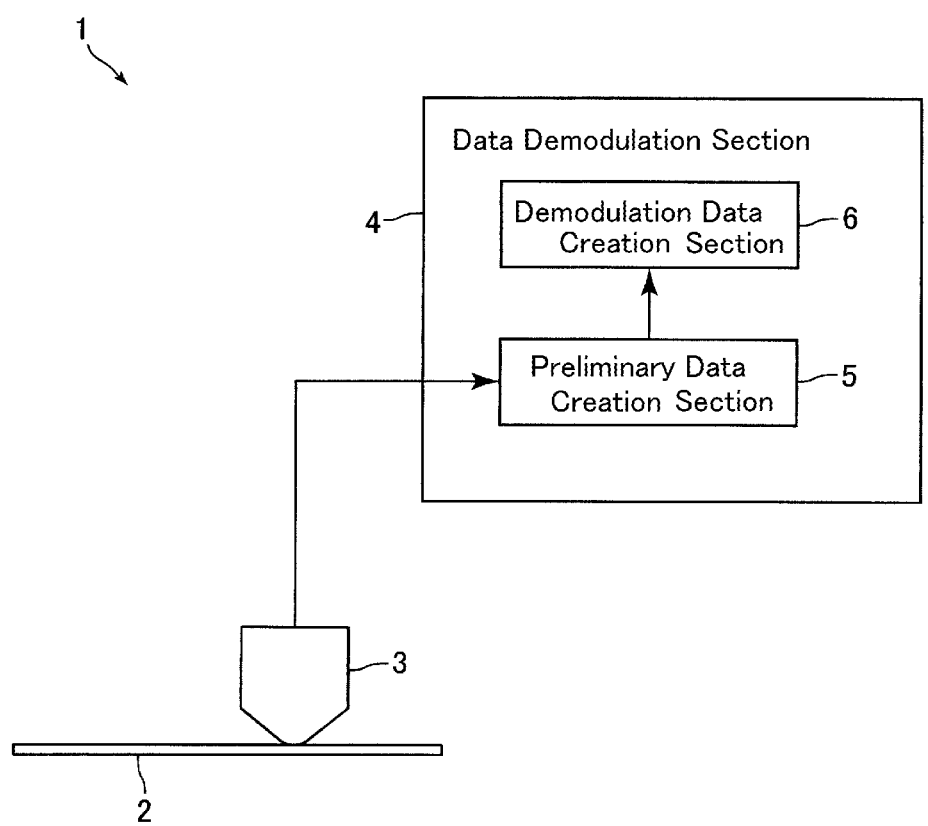
FIG. 1 is a block diagram showing a schematic structure of a demodulation device of magnetic data in accordance with an embodiment of the present invention.

FIG. 1 is a block diagram showing a schematic structure of a demodulation device 1 of magnetic data in accordance with an embodiment of the present invention. FIG. 2 is an explanatory view showing a schematic creating procedure of demodulation data in a data demodulation section 4 shown in FIG. 1. FIG. 3 is a table for explaining a plurality of preliminary data strings which are created in a preliminary data creation section 5 shown in FIG. 1. FIG. 4 is a table for explaining a template which is stored in the preliminary data creation section 5 shown in FIG. 1. FIGS. 5(A) through 5(F) are tables for explaining intervals which are stored in a data storage section of the preliminary data creation section 5 shown in FIG. 1.

A demodulation device 1 of magnetic data in this embodiment is a device which is structured to read magnetic data recorded on a card 2 as a magnetic information recording medium and create demodulation data. For example, the demodulation device 1 is a manual type card reader which is structured to read magnetic data of a card 2 while the card 2 is moved manually. The demodulation device 1 includes a magnetic head 3 configured to read magnetic data recorded on a card 2 and a data demodulation section 4 in which magnetic data read by the magnetic head 3 are demodulated and demodulation data are created. In this embodiment, magnetic data are recorded on a card 2 by "F2F" frequency modulation system.

A card 2 is, for example, a rectangular card made of vinyl chloride whose thickness is about 0.7-0.8 mm. The card 2 is formed with a magnetic stripe in which magnetic data are recorded. The card may be incorporated with an IC chip and/or an antenna for data communication. Further, a card 2 may be a PET (polyethylene terephthalate) card whose thickness is about 0.18-0.36 mm or a paper card having a predetermined thickness.

The data demodulation section 4 is configured of a memory means such as ROM and RAM, an arithmetic operation means such as CPU and the like, or an ASIC (application specific integrated circuit). The data demodulation section 4 includes a preliminary data creation section 5 which creates a plurality of preliminary data strings for creating demodulation data and a demodulation data creation section 6 which creates demodulation data based on a plurality of the preliminary data strings created by the preliminary data creation section 5.

The preliminary data creation section 5 creates a preliminary data string for creating demodulation data based on an interval that is a time interval between peaks of an analog-shaped read signal of magnetic data (see FIG. 2) outputted from the magnetic head 3. A preliminary data string in this embodiment is configured of a first individual data which is "0" data or "1" data specified on the basis of the interval and is configured of the first individual data of five (5) successive bits.

As described below, in this embodiment, each time a peak of a read signal which is outputted from the magnetic head 3 is detected, a preliminary data string is created. In a range of a read signal shown in FIG. 2, the preliminary data creation section 5 creates eleven preliminary data strings, i.e., the preliminary data string "1" through the preliminary data string "11" as shown in FIG. 3. Further, in this embodiment, as described below, after a peak of a read signal has not been detected, a preliminary data string is created by creating a pseudo-peak four times and the preliminary data creation section 5 creates four preliminary data strings of the preliminary data string "12" through the preliminary data string "15" by generating a pseudo-peak. A detail creating method of a preliminary data string in the preliminary data creation section 5 will be described below. In the example shown in FIG. 2, the magnetic data corresponding to the interval "t15" is a magnetic data of a final bit. Further, for convenience of explanation, FIG. 2 shows an example of a waveform of a read signal when a card 2 is moved at a constant speed.

The demodulation data creation section 6 creates demodulation data based on the first individual data which configure the preliminary data string. Specifically, the demodulation data creation section 6 specifies the first individual data of the first bit of a preliminary data string (the first individual data of the left end in FIG. 3) as a demodulation data creating data (in other words, the demodulation data creation section 6 creates a demodulation data creating data based on a preliminary data string) and a demodulation data is created on the basis of the demodulation data creating data. In this embodiment, when a demodulation data creating data is "0" data, the demodulation data is determined as one "0" data as it is and, when two successive demodulation data creating data are "1" data, the demodulation data is determined as one "1" data (see FIG. 2). Therefore, in this embodiment, an odd number of the first individual data "1" is not generated between two of the first individual data "0".

The preliminary data creation section 5 stores a template in which a part of a plurality of bit patterns configured of second individual data of 5 bits is listed. The template in this embodiment is, as shown in FIG. 4, listed with 13 bit patterns, i.e., the bit pattern "1" through the bit pattern "13" among 32 bit patterns which are conceivable as bit patterns of 5 bits. As described above, an odd number of the first individual data "1" is not generated between two of the first individual data "0" and thus bit patterns that an odd number of "1" data is generated between "0" data are not listed in the template which is stored in the preliminary data creation section 5. In this connection, there are 12 bit patterns that an odd number of "1" data is generated between "0" data.

The preliminary data creation section 5 is provided with a data storage section in which an interval that is a time interval between peaks is stored each time a peak of a read signal which is outputted from the magnetic head 3 is detected. The interval is successively measured and stored in the data storage section of the preliminary data creation section 5. In this embodiment, the preliminary data creation section 5 is provided with the data storage section having ten data storage parts (0) through (9) (see FIGS. 5(A) through 5(F)) and the latest interval is stored in the data storage part (9). When the latest interval is stored in the data storage part (9), the interval having been stored in the data storage part (N) ("N" is an integer from "1" to "9") is stored in the data storage part (N−1). In other words, the intervals "t1" through "t15" stored in the data storage part (9) are successively shifted from the data storage part (9)→the data storage part (8)→ . . . the data storage part (1)→the data storage part (0) each time a peak of the read signal is detected (see FIGS. 5(A) through 5(F)).

In this embodiment, the intervals stored in the data storage parts (9) through (5) are determined intervals which are used to specify the first individual data to create a preliminary data string of 5 bits and the first individual data are specified on the basis of the determined intervals stored in the data storage parts (9) through (5) and the preliminary data string of 5 bits are created. For example, as shown in FIG. 5(A), a preliminary data string of 5 bits is created on the basis of the determined intervals "t9" through "t5" which are stored in the data storage parts (9) through (5). Alternatively, when the next peak of the read signal is detected and the next interval "t10" is stored in the data storage part (9), as shown in FIG. 5(B), a preliminary data string of 5 bits is created on the basis of the determined intervals "t10" through "t6" stored in the data storage sections (9) through (5). In the following description, a determined interval stored in the data storage part (5) is referred to as a determined interval "1" which is the first interval to be determined, a determined interval stored in the data storage part (6) is referred to as a determined interval "2" which is the second interval to be determined, a determined interval stored in the data storage part (7) is referred to as a determined interval "3" which is the third interval to be determined, a determined interval stored in the data storage part (8) is referred to as a determined interval "4" which is the fourth interval to be determined, and a determined interval stored in the data storage part (9) is referred to as a determined interval "5" which is the fifth interval to be determined.

As described above, the latest interval is stored in the data storage part (9) and the intervals "t1" through "t15" stored in the data storage part (9) are successively shifted from the data storage part (9)→the data storage part (8)→ . . . the data storage part (1)→the data storage part (0) each time a peak of the read signal is detected. Therefore, an interval which is newly stored in the data storage part (9) when a peak of the read signal is detected is set as the determined interval "5". Further, the determined interval "5" having been stored in the data storage part (9) when the peak of the read signal is detected is shifted to the data storage part (8) and set as the determined interval "4", the determined interval 4 having been stored in the data storage part (8) is shifted to the data storage part (7) and set as the determined interval "3", the determined interval "3" having been stored in the data storage part (7) is shifted to the data storage part (6) and set as the determined interval "2", and the determined interval "2" having been stored in the data storage part (6) is shifted to the data storage part (5) and set as the determined interval "1". In other words, the "m"-th ("m" is an integer from 2 to 5) determined interval having been already stored in the data storage part is set as the "m−1"-th determined interval when a peak of the read signal is detected.

The intervals stored in the data storage parts (4) through (1) are calculation intervals for calculating a reference interval for determining whether the first individual data configuring a preliminary data string is "0" or "1". The reference interval is calculated on the basis of the calculation intervals stored in the data storage parts (4) through (1) as described below. In the following description, a calculation interval stored in the data storage part (4) is referred to as a calculation interval "4", a calculation interval stored in the data storage part (3) is referred to as a calculation interval "3", a calculation interval stored in the data storage part (2) is referred to as a calculation interval "2", and a calculation interval stored in the data storage part (1) is referred to as a calculation interval "1".

The interval stored in the data storage part (0) is an interval for eliminating influence of noise. In a case that the latest interval stored in the data storage part (9) is not more than a predetermined value and thus it is estimated that noise has been detected, the sum of the interval newly stored in the data storage part (9) and the interval stored in the data storage part (8) is stored in the data storage part (9) and, in addition, the interval stored in the data storage part ("M−1") (M is an integer from "1" to "7")) is stored in the data storage part (M). In other words, in this case, the sum of the interval newly stored in the data storage part (9) and the interval stored in the data storage part (8) is stored in the data storage part (9) and, in addition, the intervals stored in the data storage part (0) through the data storage part (8) are successively shifted from the data storage part (0)→the data storage part (1)→ . . . the data storage part (7)→the data storage part (8).

(Demodulation Method of Magnetic Data)

Figure 6:
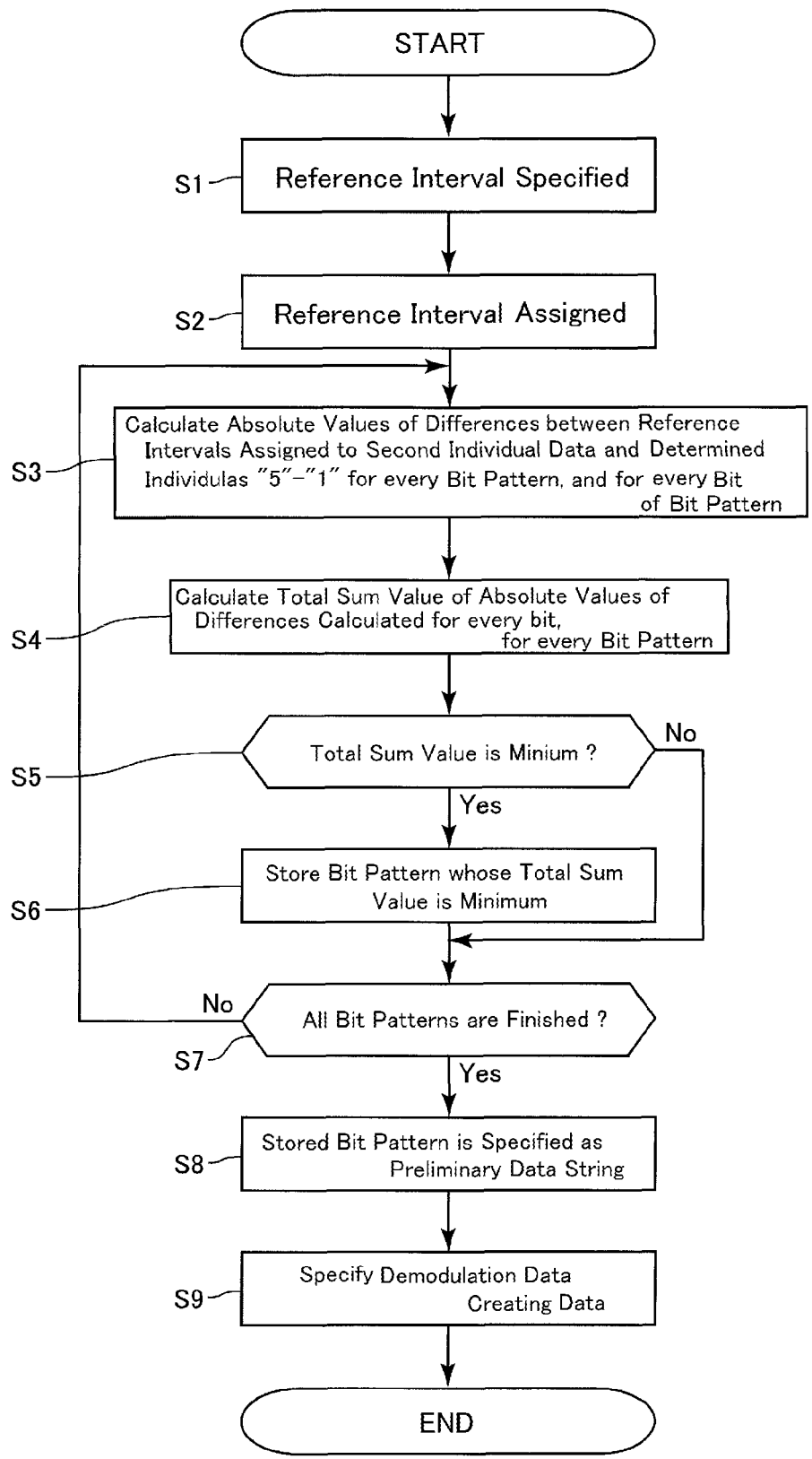
FIG. 6 is a flow chart for explaining a creating method of a preliminary data string and demodulation data creating data in a data demodulation section shown in FIG. 1.
Figure 9:
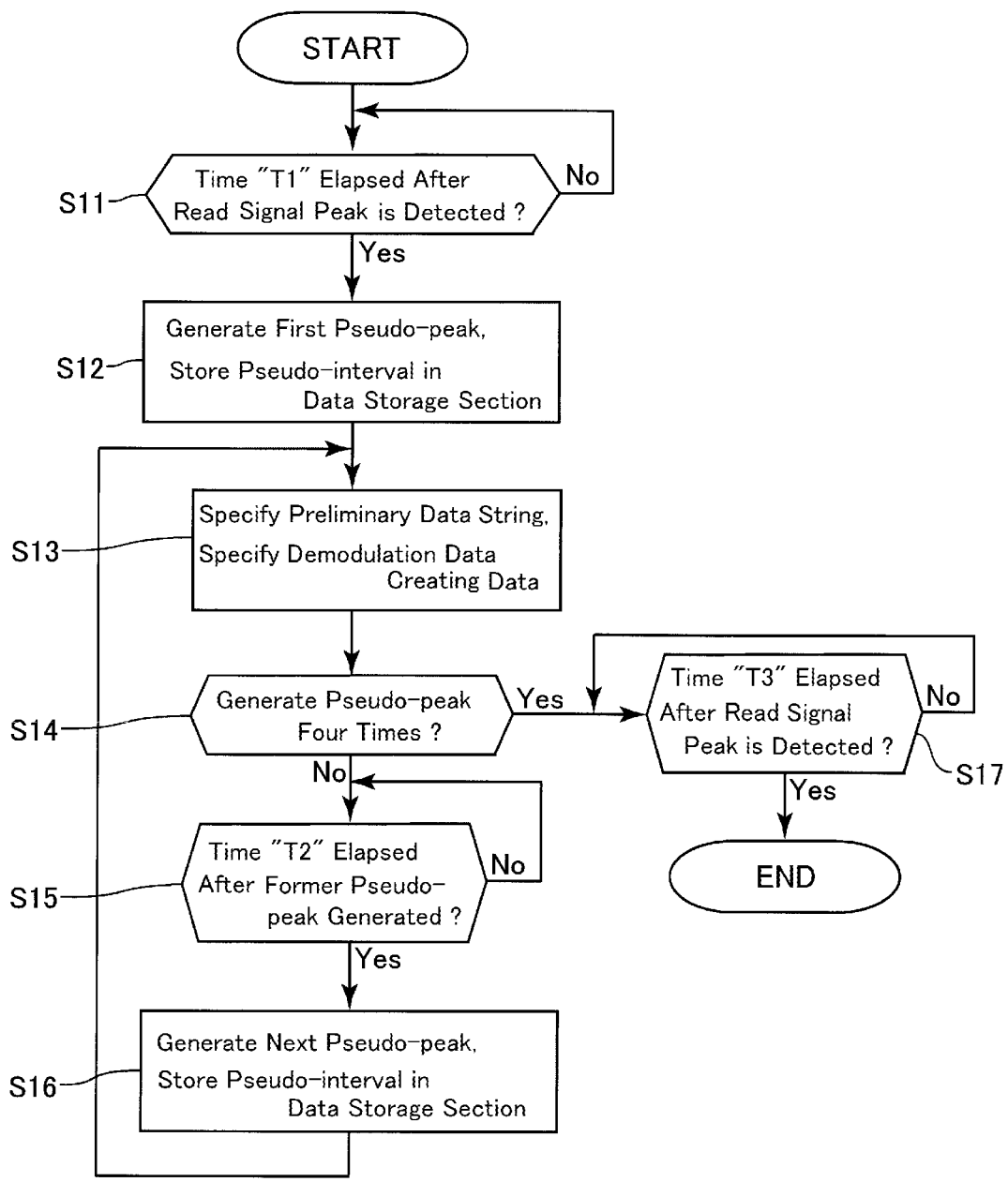
FIG. 9 is a flow chart for explaining a control method when a pseudo-peak is generated in the demodulation device of magnetic data shown in FIG. 1.

FIG. 6 is a flow chart for explaining a creating method of a preliminary data string and demodulation data creating data in the data demodulation section 4 shown in FIG. 1. FIG. 7 is a table for specifically explaining a specifying method of a reference interval in a reference interval specifying step "S1" shown in FIG. 6. FIGS. 8(A) through 8(E) are tables for explaining intervals which are stored in the data storage parts of the preliminary data creation section 5 when a pseudo-peak is generated in the demodulation device 1 of magnetic data shown in FIG. 1. FIG. 9 is a flow chart for explaining a control method when a pseudo-peak is generated in the demodulation device 1 of magnetic data shown in FIG. 1.

A demodulation method of magnetic data in the data demodulation section 4 will be described below. Demodulation of magnetic data in the data demodulation section 4 may be realized by hardware or by software. When demodulation of magnetic data is realized by hardware, in comparison with a case that demodulation of magnetic data is realized by software, demodulation processing can be performed at a high speed. On the other hand, when demodulation of magnetic data is realized by software, the number of bits of the first individual data configuring the preliminary data string can be easily changed by rewriting of the program. The preliminary data creation section 5 in this embodiment includes a timer for generating a pseudo-peak and a pseudo-peak is generated by hardware but a pseudo-peak may be generated by software. In this embodiment, specifically, a pseudo-peak is generated on the basis of a clock created by an ASIC.

When the number of intervals stored in the data storage parts of the preliminary data creation section 5 becomes seven or larger, creation of a preliminary data string is started each time the latest interval is stored in the data storage part (9). When creation of a preliminary data string is started, first, the preliminary data creation section 5 specifies, as shown in FIG. 6, a reference interval for determining whether the first individual data configuring a preliminary data string is "0" or "1" (step "S1").

For example, in this embodiment, in a case that the "p"-th preliminary data string is to be created, "0" and "1" of the first individual data corresponding to the calculation intervals "4" through "1" have been already determined in the creating process to the "p−1"-th preliminary data string. In the step "S1", the preliminary data creation section 5 calculates a reference interval depending on the first individual data corresponding to the calculation intervals "4" through "1" as described below and the calculated reference interval is updated as a new reference interval. In other words, the new calculated reference interval is specified as a reference interval for creating the "p"-th preliminary data string.

In a case that, as shown in the pattern "A" in FIG. 7, both of the first individual data corresponding to the calculation intervals "4" and "3" are "0", an average value of the calculation intervals "4" and "3" is specified as a first reference interval which is a reference for determining that the first individual data is "0" and, in addition, a half value of the first reference interval is specified as a second reference interval which is a reference for determining that the first individual data is "1". In other words, in a case of the pattern "A", the values calculated on the basis of the following expression are specified as a first reference interval and a second reference interval. In the following expression, the calculation interval 4 is indicated as "calculation IV4", the calculation interval 3 is indicated as "calculation IV3", the calculation interval 2 is indicated as "calculation IV2", and the calculation interval 1 is indicated as "calculation "IV1".

The first reference interval=(calculation $IV4$+calculation $IV3$)/2

The second reference interval=the first reference interval/2

In a case that the first individual data corresponding to the calculation interval "4" is "0" and the first individual data corresponding to the calculation interval "3" is "1" as shown in the pattern "B" in FIG. 7, as described above, an odd number of the first individual data "1" is not generated between two first individual data "0" and thus the first individual data corresponding to the calculation interval "2" is estimated to be "1". As a result, the values calculated on the basis of the following expression are specified as the first reference interval and the second reference interval.

The first reference interval=(calculation $IV4$+calculation $IV3$+calculation $IV2$)/2

The second reference interval=the first reference interval/2

Further, as shown in the pattern "C" in FIG. 7, in a case that the first individual data corresponding to the calculation interval "4" is "1", the first individual data corresponding to the calculation interval "3" is "0", and the first individual data corresponding to the calculation interval "2" is "0", the values calculated on the basis of the following expression are specified as the first reference interval and the second reference interval.

The first reference interval=(calculation $IV3$+calculation $IV2$)/2

The second reference interval=the first reference interval/2

Further, as shown in the pattern "D" in FIG. 7, in a case that the first individual data corresponding to the calculation interval "4" is "1", the first individual data corresponding to the calculation interval "3" is "0", and the first individual data corresponding to the calculation interval "2" is "1", the first individual data corresponding to the calculation interval "1" is estimated to be "1" and thus the values calculated on the basis of the following expression are specified as the first reference interval and the second reference interval.

The first reference interval=(calculation $IV3$+calculation $IV2$+calculation $IV1$)/2

The second reference interval=the first reference interval/2

Further, as shown in the pattern "E" in FIG. 7, in a case that the first individual data corresponding to the calculation interval "4" is "1", the first individual data corresponding to the calculation interval "3" is "1", the first individual data corresponding to the calculation interval "2" is "1", and the first individual data corresponding to the calculation interval "1" is "0", the values calculated on the basis of the following expression are specified as the first reference interval and the second reference interval.

The first reference interval=(calculation $IV3$+calculation $IV2$+calculation $IV1$)/2

The second reference interval=the first reference interval/2

Further, as shown in the pattern "F" in FIG. 7, in a case that each of the first individual data corresponding to the calculation intervals "4" through "1" is "1", the values calculated on the basis of the following expression are specified as the first reference interval and the second reference interval.

The first reference interval=(calculation $IV4$+calculation $IV3$+calculation $IV2$+calculation $IV1$)/2

The second reference interval=the first reference interval/2

Further, as shown in the pattern "G" in FIG. 7, in a case that the first individual data corresponding to the calculation interval "4" is "1", the first individual data corresponding to the calculation interval "3" is "1", and the first individual data corresponding to the calculation interval "2" is "0", the values calculated on the basis of the following expression are specified as the first reference interval and the second reference interval.

The first reference interval=(calculation $IV4$+calculation $IV3$+calculation $IV2$)/2

The second reference interval=the first reference interval/2

When the reference interval is specified in the step "S1", the preliminary data creation section 5 assigns the reference interval to the template stored in the preliminary data creation section 5 (step "S2"). In the step "S2", the preliminary data creation section 5 assigns the first reference interval when the second individual data is "0" and the second reference interval when the second individual data is "1" to the template for each of the second individual data configuring bit patterns. For example, in a case that the first reference interval is 681 (μsec) and the second reference interval is 340.5 (μsec), as shown in FIG. 4, the first reference interval of 681 (μsec) is assigned to the second individual data "0" and the second reference interval of 340.5 (μsec) is assigned to the second individual data "1".

After that, the preliminary data creation section 5 calculates absolute values of differences between the first reference interval or the second reference interval assigned to the second individual data configuring bit patterns and five determined intervals "5" through "1" for every bit pattern and for every bit of the bit pattern (step "S3"). In the step "S3", first, the preliminary data creation section 5 calculates absolute values of differences between the first reference interval or the second reference interval assigned to the second individual data and the determining intervals "5" through "1" for every bit of one bit pattern. For example, in the step "S3", as shown in FIG. 4, the preliminary data creation section 5 calculates absolute values of the differences of the bit pattern "1" and the values of "240", "403", "343", "50" and "44" are obtained.

After that, the preliminary data creation section 5 calculates a total sum value which is the total sum of the absolute values of the differences calculated for every bit (in other words, the total sum for every bit pattern) (step "S4"). For example, in the step "S4", the preliminary data creation section 5 calculates to obtain "1080" as the total sum value for the bit pattern "1" as shown in FIG. 4.

After that, the preliminary data creation section 5 judges whether the calculated total sum value is the minimum value or not (step "S5") and, when the calculated total sum value is the minimum value ("Yes" in the step "S5"), the bit pattern whose total sum value is the smallest is stored in the preliminary data creation section 5 (step "S6"). After that, the preliminary data creation section 5 judges whether calculation of the total sum value for all the bit patterns has been finished or not (step "S7"). In the step "S7", in a case that calculation of the total sum value has not been finished for all the bit patterns ("No" in the step "S7"), the flow is returned to the step "S3". Further, in the step "S5", when the calculated total sum value is not the minimum value ("No" in the step "S5"), the flow advances to the step "S7".

On the other hand, in the step "S7", in a case that calculation of a total sum value for all bit patterns has been finished ("Yes" in the step "S7"), the preliminary data creation section 5 specifies the bit pattern stored in the step "S6" as a preliminary data string (step "S8"). For example, as shown in FIG. 4, the minimum value of the total sum value is "399" of the bit pattern "3" and thus, in the step "S8", the bit pattern "3" is stored in the preliminary data creation section 5 and the preliminary data creation section 5 specifies the bit pattern (01100) as the preliminary data string. In other words, in the step "S8", the preliminary data creation section 5 creates a preliminary data string (01100).

In the step "S8", when the preliminary data string is specified, for example, creation of a "p"-th preliminary data string has been finished. After that, the demodulation data creation section 6 specifies the first individual data of the first bit of the preliminary data string specified in the step "S8" as a data for creating demodulation data, i.e., a demodulation data creating data (step "S9"). The data for creating demodulation data, i.e., the demodulation data creating data which is specified in the step "S9" is the data corresponding to the determined interval "1". In other words, in a case that the number of the determined intervals is "n", the demodulation data creating data is the data corresponding to the determined interval "1", i.e., the first of the "n" determined intervals.

Next, after the creation of the "p"-th preliminary data string has been finished, when a peak of the read signal is detected and the latest interval is stored in the data storage part (9), a "p+1"-th preliminary data string is created according to the flow shown in FIG. 6 and a demodulation data creating data is created. In this manner, preliminary data strings are successively created and demodulation data creating data are successively created. In this embodiment, as shown in FIG. 2, in a case that the magnetic data corresponding to the interval "t15" is a magnetic data of a final bit, for example, in a case that a postamble is not recorded on a magnetic information recording medium, when the interval "t15" is stored in the data storage part (9) as shown in FIG. 8(A), after that, a peak of the read signal is not detected. Therefore, after the interval "t15" is stored in the data storage part (9), a preliminary data string is not created (specifically, the preliminary data string 12 through the preliminary data string 15 shown in FIG. 3 are not created) and thus demodulation data creating data corresponding to the intervals "t12" through "t15" are not created.

In order to prevent this problem, in this embodiment, after the interval "t15" is stored in the data storage part (9), pseudo-peaks are generated to create preliminary data strings and demodulation data creating data corresponding to the intervals "t12" through "t15" are created. Specifically, as shown in FIG. 9, when a predetermined time "T1" (for example, 10-15 m sec) has elapsed after a peak of the read signal is detected ("Yes" in the step "S11"), the preliminary data creation section 5 generates a first pseudo-peak and a pseudo-interval "tD1" is stored in the data storage part (9) (step "S12"). In other words, after the interval "t15" corresponding to the magnetic data of the final bit is stored in the data storage part (9) and, when it is confirmed that a peak of the read signal is not detected, the preliminary data creation section 5 generates a first pseudo-peak and the pseudo-interval "tD1" is stored in the data storage part (9). The predetermined time "T1" is a time period which is set for generating a first pseudo-peak and is set to be a time period corresponding to an interval of a plurality of bits or more of data "zero". Therefore, a time interval corresponding to a plurality of bits of data "zero" has elapsed without detecting a peak of the read signal, a first pseudo-peak is generated. Further, the predetermined time "T1" and a predetermined fixed time "T2" described below are set so that a necessary number of pseudo-peaks can be generated within a predetermined time "T3" which is normally required to determine the end of data. In this embodiment, four pseudo-peaks can be generated within the predetermined time "T3". Normally, all "0" magnetic data of about 22 bits are recorded in a preamble on a magnetic information recording medium and all "0" magnetic data of about 13-30 bits are recorded in a postamble. Therefore, it is easy to detect whether the preamble and the postamble are recorded or not and thus, it may be structured that, in a case that the all "0" magnetic data of the preamble and the postamble are not detected, the pseudo-peaks are generated. Alternatively, regardless of existence/absence of the preamble and the postamble, the pseudo-peaks may be generated.

As shown in FIG. 8(B), the pseudo-interval "tD1" stored in the data storage part (9) in the step "S12" is set as the determined interval "5", the interval "t15" is shifted to the determined interval "4", the interval "t14" is shifted to the determined interval "3", the interval "t13" is shifted to the determined interval "2", and the interval "t12" is shifted to the determined interval "1". In other words, the "m"-th determined interval ("m" is an integer from 2 to 5 as described above) which is stored in the data storage part when the first pseudo-peak is generated is shifted to the "m−1"-th determined interval. Further, the interval "t11" is shifted to the calculation interval "4", the interval "t10" is shifted to the calculation interval "3", the interval "t9" is shifted to the calculation interval 2, and the interval "t8" is shifted to the calculation interval "1".

After that, the steps similar to the steps "S1" through "S9" are executed, the preliminary data string (specifically, the preliminary data string 12 shown in FIG. 3) is specified, and the demodulation data creating data is specified (step "S13"). In other words, the demodulation data creating data corresponding to the interval "t12" which is the determined interval "1" is created. After that, the preliminary data creation section 5 judges whether the pseudo-peak has been generated four times or not (step "S14"). In a case that the pseudo-peak has not been generated four times in the step "S14" ("No" in the step "S14"), the preliminary data creation section 5 judges whether a predetermined fixed time "T2" (for example, 1 through 3 msec) has elapsed from generation of the former pseudo-peak or not (step "S15") and, when the predetermined fixed time "T2" has elapsed ("Yes" in the step "S15"), the preliminary data creation section 5 generates a next pseudo-peak and a pseudo-interval is stored in the data storage part (9) (step "S16"). When the next pseudo-peak is generated and, when a pseudo-interval is stored in the data storage part (9), the flow is returned to the step "S13" and a preliminary data string is specified and a demodulation data creating data is specified.

For example, in the step "S16", the second pseudo-peak is generated and, as shown in FIG. 8(C), a pseudo-interval "tD2" is stored in the data storage part (9) and the pseudo-interval "tD2" is set as the determined interval "5". Further, the pseudo-interval "tD1" is shifted to the determined interval "4", the interval "t15" is shifted to the determined interval "3", the interval "t14" is shifted to the determined interval "2", and the interval "t13" is shifted to the determined interval "1". After that, in the step "S13", the preliminary data string 13 shown in FIG. 3 is specified and a demodulation data creating data corresponding to the interval "t13" which is the determined interval "1" is created.

Alternatively, in the step "S16", a third pseudo-peak is generated and, as shown in FIG. 8(D), a pseudo-interval "tD3" is stored in the data storage part (9) and the pseudo-interval "tD3" is set as the determined interval "5", the pseudo-interval "tD2" is shifted to the determined interval "4", the pseudo-interval "tD1" is shifted to the determined interval "3", the interval "t15" is shifted to the determined interval "2", and the interval "t14" is shifted to the determined interval "1". After that, in the step "S13", the preliminary data string 14 shown in FIG. 3 is specified and a demodulation data creating data corresponding to the interval "t14" which is the determined interval "1" is created.

Alternatively, in the step "S16", a fourth pseudo-peak is generated and, as shown in FIG. 8(E), a pseudo-interval "tD4" is stored in the data storage part (9) and the pseudo-interval "tD4" is set as the determined interval "5", the pseudo-interval "tD3" is shifted to the determined interval "4", the pseudo-interval "tD2" is shifted to the determined interval "3", the pseudo-interval "tD1" is shifted to the determined interval "2", and the interval "t15" is shifted to the determined interval "1". After that, in the step "S13", the preliminary data string 15 shown in FIG. 3 is specified and a demodulation data creating data corresponding to the interval "t15" which is the determined interval "1" is created.

On the other hand, in a case that a pseudo-peak is generated four times in the step "S14" ("Yes" in the step "S14"), in other words, in a case that "(n−1)" pseudo-peaks are generated for "n" data storage parts in which "n" determined intervals are stored, all the peaks of the read signal generated before the pseudo-peak is generated have been demodulated. Therefore, when a predetermined time "T3" (for example, 20 through 25 msec) which is determined to detect the end of data has elapsed after a peak of the read signal is detected ("Yes" in the step "S17"), specification (determination) of the preliminary data string and the demodulation data creating data has finished.

When the demodulation data creating data corresponding to all of the intervals are specified (in other words, when "0" and "1" of the demodulation data creating data corresponding to all of the intervals are specified) as described above, the demodulation data creation section 6 creates demodulation data based on the specified demodulation data creating data (data for creating demodulation data). In this embodiment, the pseudo-intervals "tD1" through "tD4" are, for example, set so that the first individual data corresponding to the pseudo-intervals "tD1" through "tD4" are "0" (see the preliminary data strings "12" through "15" in FIG. 3).

The step "S1" in this embodiment is a reference interval specifying step which specifies the first reference interval, which is a reference for determining that the first individual data of a preliminary data string is "0", and the second reference interval which is a reference for determining that the first individual data is "1". Further, the step "S2" is a reference interval assigning step in which, for every second individual data, the first reference interval is assigned to a template stored in the preliminary data creation section 5 when the second individual data is "0", and the second reference interval is assigned to the template when the second individual data is "1". In addition, the step "S3" is a comparing step in which five determined intervals "5" through "1" and the first reference interval or the second reference interval assigned to the template are compared with each other for every bit pattern, and for every bit of the bit pattern. Further, the steps "S4" through "S6" and "S8" are a preliminary data specifying step in which, based on a compared result in the step "S3" that is the comparing step, a bit pattern corresponding to a preliminary data string is specified and the specified bit pattern is set as a preliminary data string.

Further, the steps "S1" through "S8" in this embodiment are a first data creating step in which a preliminary data string for creating demodulation data is created on the basis of intervals that are time intervals between peaks of a read signal of magnetic data. Further, the step "S9" is a second data creating step in which a demodulation data creating data (data for creating demodulation data) is created on the basis of the preliminary data string having been created in the first data creating step. In the step "S9", the first individual data of the first bit of the preliminary data string specified in the step "S8" is specified as a demodulation data creating data (data for creating demodulation data). In this embodiment, an interval is stored in the data storage section each time a peak of a reading signal is detected and then, the first data creating step and the second data creating step are executed each time the interval is stored in the data storage section.

Further, the step "S13" in this embodiment is an additional first data creating step similar to the first data creating step and an additional second data creating step similar to the second data creating step. In this embodiment, pseudo-peaks are generated in a fixed time "T2" (at fixed time intervals) and pseudo-intervals are stored in the data storage part (9) until a demodulation data creating data corresponding to the final interval "t15" is created, and execution of the step "S13", in other words, execution of the additional first data creating step and the additional second data creating step is repeated.

In the additional first data creating step, the steps "S1" through "S8" are performed and the step "S9" is performed in the additional second data creating step.

Principal Effects in this Embodiment

As described above, in this embodiment, when a peak of a read signal is not detected during a certain predetermined time period "T1", a pseudo-peak is generated and a pseudo-interval is stored in the data storage part (9). As a result, the stored pseudo-interval is set as the fifth determined interval and the "m"-th determined interval having been stored in the data storage section at the time of generation of the pseudo-peak is shifted to the "m−1"-th determined interval and thereby a preliminary data string is specified and a demodulation data creating data is specified. Further, in this embodiment, a pseudo-peak is generated and a pseudo-interval is stored in the data storage part (9) and execution of the step "S13" is repeated until a demodulation data creating data corresponding to the final interval "t15" is created. Therefore, for example, in a case that magnetic data are read from a preamble side and a postamble is not recorded on a card 2 or, in a case that magnetic data are read from a postamble side and a preamble is not recorded on a card 2 and, in addition, a magnetic data corresponding to the interval "t15" is a magnetic data of the final bit recorded in an effective data part of the card 2, in this embodiment, even after the last peak of the read signal of magnetic data recorded in the effective data part is detected, a pseudo-interval is stored in the data storage part (9) with a pseudo-peak as a trigger and magnetic data for the last 4 (four) bits of magnetic data recorded in the effective data part are demodulated. As a result, according to this embodiment, magnetic data recorded in the effective data part of a card 2 can be demodulated to the last data regardless of existence/absence of a preamble and a postamble. Further, in this embodiment, even when the number of bits of magnetic data recorded in a preamble or a postamble is not more than 4 (4 bits or less), magnetic data recorded in the effective data part of a card 2 can be demodulated to the last data.

In this embodiment, a pseudo-peak is generated in a fixed time "T2" and a pseudo-interval is stored in the data storage section until a demodulation data creating data corresponding to the final interval "t15" is created. Therefore, in this embodiment, in comparison with a case that a time interval for generating a pseudo-peak is varied, a demodulation method of magnetic data and a demodulation device of magnetic data can be simplified and a circuit structure and the like of the data demodulation section 4 can be simplified.

Other Embodiments

Although the present invention has been shown and described with reference to a specific embodiment, various changes and modifications will be apparent to those skilled in the art from the teachings herein.

Figures 10, 11:
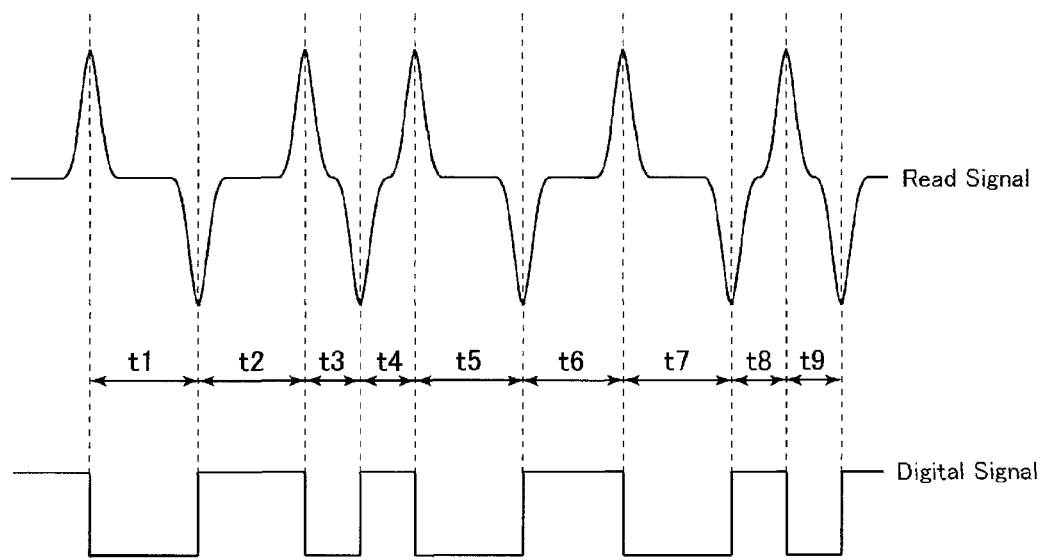
FIG. 10 is an explanatory view showing a schematic creating procedure of demodulation data in accordance with another embodiment of the present invention.
FIG. 11 is an explanatory view showing a structure of magnetic data which are recorded on a magnetic information recording medium.

In the embodiment described above, the preliminary data creation section 5 creates a plurality of preliminary data strings for creating demodulation data based on the intervals "t1" through "t15" which are time intervals between peaks of an analog-shaped read signal of magnetic data outputted from the magnetic head 3. However, the present invention is not limited to this embodiment. For example, the preliminary data creation section 5 may create a plurality of preliminary data strings for creating demodulation data based on the intervals "t1" through "t15" which are inversion time intervals of a digital signal (see FIG. 10) which is created from an analog-shaped read signal of magnetic data. In this case, the latest interval is stored in the data storage part (9) each time an inversion of a digital signal is detected.

In the embodiment described above, in the step "S3", the preliminary data creation section 5 calculates absolute values of differences between the first reference interval or the second reference interval assigned to the second individual data configuring bit patterns and five determined intervals "5" through "1" for every bit pattern and for every bit of the bit pattern. However, the present invention is not limited to this embodiment. For example, it may be structured that, in the step "S3", the preliminary data creation section 5 calculates square values that are the squares of differences between the first reference interval or the second reference interval assigned to the second individual data configuring bit patterns and five determined intervals "5" through "1" for every bit pattern and for every bit of the bit pattern. In this case, in the step "S4", the preliminary data creation section 5 calculates a total sum value which is a total sum for every bit pattern of the square values calculated for every bit and, when the calculated total sum value is the minimum value ("Yes" in the step "S5"), the bit pattern whose total sum value is the smallest is stored in the step "S6". Further, it may be structured that, in the step "S3", the preliminary data creation section 5 calculates deviations between the first reference interval or the second reference interval assigned to the second individual data configuring bit patterns and five determined intervals "5" through "1" for every bit pattern.

In the embodiment described above, the preliminary data string is configured of the first individual data of 5 bits. However, the present invention is not limited to this embodiment. For example, the preliminary data string may be configured of the first individual data of 2 through 4 bits, or may be configured of the first individual data of 6 or more bits. In other words, when "n" is an integer of 2 or more, the preliminary data string may be configured of the first individual data of "n" bits. In this case, bit patterns configured of the second individual data of "n" bits are listed in a template. Further, in this case, in the step "S3", "n" determined intervals and the first reference interval or the second reference interval assigned to the template are compared with each other for every bit pattern, and for every bit of the bit pattern.

In the embodiment described above, 13 bit patterns "1" through "13" of 32 bit patterns conceivable as bit patterns of 5 bits are listed in the template stored in the preliminary data creation section 5. However, the present invention is not limited to this embodiment. For example, 20 bit patterns may be listed in a template in which, among 32 bit patterns conceivable as a bit pattern of 5 bits, 12 bit patterns where an odd number of "1" data is generated between two "0" data are excluded.

In the embodiment described above, the demodulation device 1 of magnetic data is a manual type card reader. However, the demodulation device 1 of magnetic data may be a card conveyance type card reader provided with a conveying mechanism such as conveying rollers for a card 2. In this case, the first reference interval and the second reference interval may be specified similarly to the embodiment described above, or the first reference interval and the second reference interval may be fixed values.

In the embodiment described above, magnetic data are recorded on a card 2 by the "F2F" frequency modulation system. However, magnetic data may be recorded on a card 2 by another magnetic recording system such as the "F3F" frequency modulation system. Further, in the embodiment described above, a magnetic information recording medium is a card 2 but the magnetic information recording medium may be other media such as a bankbook.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A demodulation method of magnetic data in which magnetic data recorded on a magnetic information recording medium are read and demodulation data are created, the demodulation method comprising:

creating a preliminary data string for creating the demodulation data on a basis of an interval which is a time interval between peaks of a read signal of an analog-shaped magnetic data or an interval which is an inversion time interval of a digital signal created from the read signal; and creating a demodulation data creating data for creating the demodulation data on a basis of the preliminary data string;

wherein in a case that "n" is an integer of not less than 2, and "m" is an integer of not less than 2 and not more than "n", the preliminary data string comprises first individual data of "n" bits which are specified on a basis of the interval;

wherein the interval is stored in a data storage section each time a peak of the read signal or an inversion of the digital signal is detected, and the creating a preliminary data string and the creating a demodulation data are executed each time the interval is stored in the data storage section;

wherein the creating the preliminary data string comprises:

specifying a first reference interval and a second reference interval, the first reference interval being the interval which is a reference for determining that the first individual data of the preliminary data string is "0", and the second reference interval being the interval which is a reference for determining that the first individual data is "1";

in a template in which all or a part of a plurality of bit patterns configured of second individual data of "n" bits are listed, assigning the first reference interval when the second individual data is "0" and assigning the second reference interval when the second individual data is "1" for each of the second individual data, comparing "n" determined intervals which are intervals for specifying the first individual data with the first reference interval or the second reference interval assigned to the template for every bit pattern, and for every bit of the bit pattern, and specifying the bit pattern corresponding to the preliminary data string on a basis of a compared result in the comparing "n" determined intervals and a specified bit pattern is determined as the preliminary data string;

wherein in the creating a demodulation data, a first bit of the first individual data of the preliminary data string specified in the specifying the bit pattern corresponding to the preliminary data string is specified as the demodulation data creating data;

wherein an interval which is newly stored in the data storage section when a peak of the read signal or an inversion of the digital signal is detected is set as an "n"-th determined interval, and an "m"-th determined interval having been stored in the data storage section when the peak of the read signal or the inversion of the digital signal is detected is set as an "m−1"-th determined interval, and the demodulation data creating data is a data corresponding to a first determined interval; and wherein when the peak of the read signal or the inversion of the digital signal is not detected for a predetermined time, a pseudo-peak is generated, a pseudo-interval is stored in the data storage section, the pseudo-interval stored is set as the "n"-th determined interval, and the "m"-th determined interval having been stored in the data storage section when the pseudo-peak is generated is set as the "m−1"-th determined interval and then, the creating a preliminary data string and the creating a demodulation data are executed an additional time, and the pseudo-peak is generated with a predetermined time interval and the pseudo-interval is stored in the data storage section and the creating a preliminary data string and the creating a demodulation data are repeatedly executed until the demodulation data creating data corresponding to a final interval is created.

2. The demodulation method of magnetic data according to claim 1, wherein the pseudo-peak is generated with a fixed time interval and the pseudo-interval is stored in the data storage section and the creating a preliminary data string and the creating a demodulation data are repeatedly executed until the demodulation data creating data corresponding to the final interval is created.

3. The demodulation method of magnetic data according to claim 2, wherein the data storage section is provided with "n" data storage parts in which the "n" determined intervals are stored and a data storage part for calculation which is provided so as to follow the "n" data storage parts and in which a calculation interval for calculating the first reference interval is stored, the determined intervals are successively shifted through the "n" data storage parts each time the peak of the read signal or the inversion of the digital signal is detected, and a first determined interval with respect to the "n" determined intervals is successively shifted to the data storage part for calculation and is used as the calculation interval.

4. The demodulation method of magnetic data according to claim 3, wherein at least "n−1" pseudo-peaks are generated for the "n" determined intervals.

5. The demodulation method of magnetic data according to claim 3, wherein a plurality of the data storage parts for calculation in which the calculation interval is stored is provided, and in the specifying a first reference interval and a second reference interval, the first reference interval is specified on a basis of a plurality of the calculation intervals which are successively shifted from the data storage parts in which the determined intervals are stored, and a half value of the first reference interval is specified as the second reference interval.

6. The demodulation method of magnetic data according to claim 5, wherein in the comparing "n" determined intervals, an absolute value of a difference between the determined interval and the first reference interval or the second reference interval assigned to the template is calculated for every bit pattern, and for every bit of the bit pattern, and in the specifying the bit pattern corresponding to the preliminary data string, a total sum value is calculated which is a total sum for every bit pattern of the absolute values calculated for every bit in the comparing step and the bit pattern whose calculated total sum value is the smallest is set as the preliminary data string.

7. A demodulation device of magnetic data for use with a magnetic information recording medium having magnetic data recorded thereon, the demodulation device comprising:

a magnetic head structured to read the magnetic data recorded on the magnetic information recording medium; and a data demodulation section structured to demodulate the magnetic data read by the magnetic head to create demodulation data, the data demodulation section comprising:

a preliminary data creation section structured to create a preliminary data string for creating the demodulation data on a basis of an interval which is a time interval between peaks of a read signal of an analog-shaped magnetic data outputted from the magnetic head or an interval which is an inversion time interval of a digital signal created from the read signal; and a demodulation data creation section structured to create the demodulation data on a basis of the preliminary data string created in the preliminary data creation section;

wherein in a case that "n" is an integer of not less than 2, and "m" is an integer of not less than 2 and not more than "n", the preliminary data string comprises first individual data of "n" bits specified on a basis of the interval;

wherein the preliminary data creation section is provided with a data storage section in which the interval is stored each time a peak of the read signal or an inversion of the digital signal is detected, and the preliminary data creation section is stored with a template in which all or a part of a plurality of bit patterns configured of second individual data of "n" bits are listed;

wherein the preliminary data creation section is structured to execute a first data creating step each time the interval is stored in the data storage section, the first data creating step comprising:

a reference interval specifying step in which a first reference interval and a second reference interval are specified, the first reference interval being the interval which is a reference for determining that the first individual data of the preliminary data string is "0", and the second reference interval being the interval which is a reference for determining that the first individual data is "1";

a reference interval assigning step in which the first reference interval is assigned to the template when the second individual data is "0" and the second reference interval is assigned to the template when the second individual data is "1" for each of the second individual data;

a comparing step in which "n" determined intervals which are intervals for specifying the first individual data are compared with the first reference interval or the second reference interval assigned to the template for every bit pattern, and for every bit of the bit pattern, and a preliminary data specifying step in which the bit pattern corresponding to the preliminary data string is specified on a basis of a compared result in the comparing step and a specified bit pattern is determined as the preliminary data string;

wherein the demodulation data creation section is structured to execute a second data creating step in which a first bit of the first individual data of the preliminary data string specified in the preliminary data creating section is specified as a demodulation data creating data for creating the demodulation data;

wherein an interval which is newly stored in the data storage section when a peak of the read signal or an inversion of the digital signal is detected is set as an "n"-th determined interval, and an "m"-th determined interval having been stored in the data storage section when the peak of the read signal or the inversion of the digital signal is detected is set as an "m−1"-th determined interval, and the demodulation data creating data which is specified in the demodulation data creation section is a data corresponding to a first determined interval;

wherein when the peak of the read signal or the inversion of the digital signal is not detected for a predetermined time, the data demodulation section is structured to generate a pseudo-peak, store a pseudo-interval in the data storage section, set the pseudo-interval stored as the "n"-th determined interval, set the "m"-th determined interval having been stored in the data storage section as the "m−1"-th determined interval when the pseudo-peak is generated, and execute an additional first data creating step similar to the first data creating step and an additional second data creating step similar to the second data creating step; and wherein the data demodulation section is structured to generate the pseudo-peak with a predetermined time interval, store the pseudo-interval in the data storage section, and repeatedly execute the additional first data creating step and the additional second data creating step until the demodulation data creating data corresponding to a final interval is created.

8. The demodulation device of magnetic data according to claim 7, wherein the data demodulation section is structured to generate the pseudo-peak with a fixed time interval, store the pseudo-interval in the data storage section, and repeatedly execute the additional first data creating step and the additional second data creating step until the demodulation data creating data corresponding to the final interval is created.

9. The demodulation device of magnetic data according to claim 8, wherein the data storage section is provided with "n" data storage parts in which the "n" determined intervals are stored and a data storage part for calculation which is provided so as to follow the "n" data storage parts and in which a calculation interval for calculating the first reference interval is stored, and the data demodulation section successively shifts the determined intervals through the "n" data storage parts each time the peak of the read signal or the inversion of the digital signal is detected, and a first determined interval with respect to the "n" determined intervals is successively shifted to the data storage part for calculation and is used as the calculation interval.

10. The demodulation device of magnetic data according to claim 9, wherein at least "n−1" pseudo-peaks are generated for the "n" determined intervals.

11. The demodulation device of magnetic data according to claim 9, wherein a plurality of the data storage parts for calculation in which the calculation interval is stored is provided, and in the reference interval specifying step in the preliminary data creation section, the first reference interval is specified on a basis of a plurality of the calculation intervals which are successively shifted from the data storage parts in which the determined intervals are stored, and a half value of the first reference interval is specified as the second reference interval.

12. The demodulation device of magnetic data according to claim 11, wherein in the comparing step in the preliminary data creation section, an absolute value of a difference between the determined interval and the first reference interval or the second reference interval assigned to the template is calculated for every bit pattern, and for every bit of the bit pattern, and a total sum value is calculated which is a total sum for every bit pattern of the absolute values calculated for every bit in the comparing step and the bit pattern whose calculated total sum value is the smallest is set as the preliminary data string.

* * * * *